Figure 1:
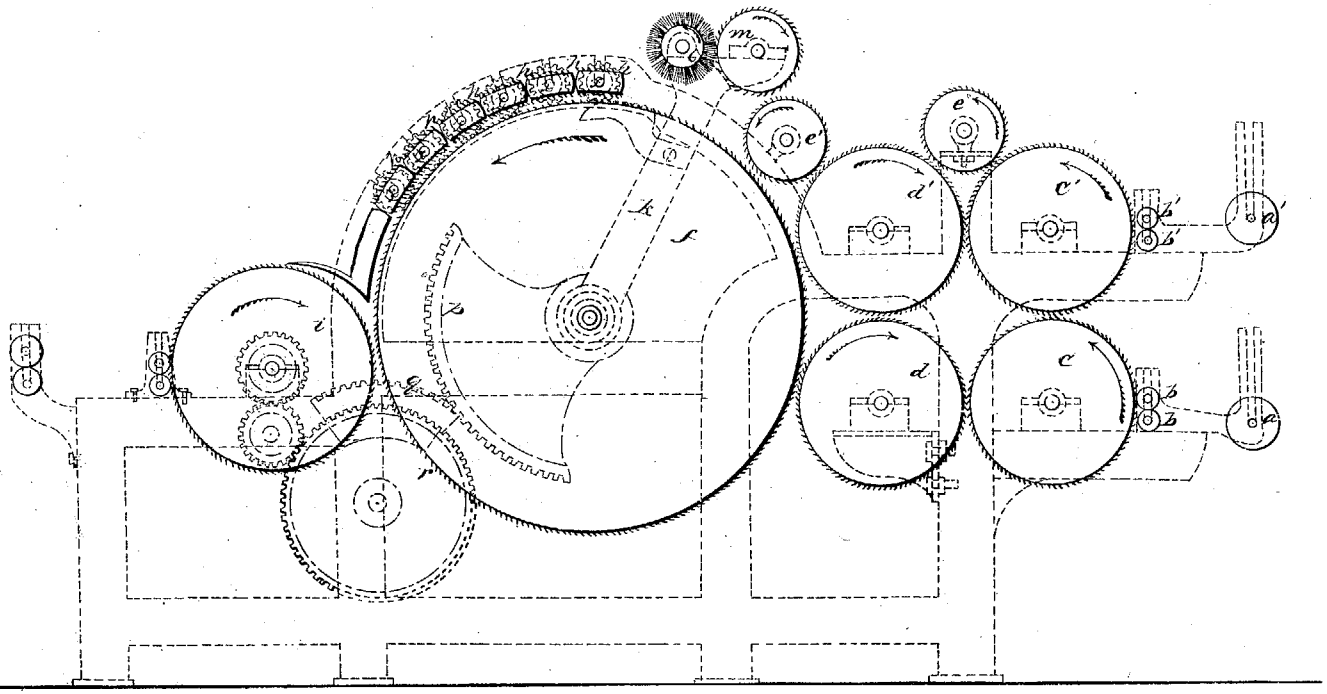

W. H. Walton.
Carding Mach.

No. 490. Reissued Sep. 1, 1857.

Inventor:
W. H. Walton

N. PETERS, PHOTO-LITHOGRAPHER, WASHINGTON, D. C.

UNITED STATES PATENT OFFICE.

WILLIAM H. WALTON, OF NEW YORK, N. Y.

IMPROVEMENT IN CARDING-ENGINES.

Specification forming part of Letters Patent No. 11,964, dated December 9, 1856; Reissue No. 422, dated January 13, 1857; Reissue No. 490, dated September 1, 1857.

*To all whom it may concern:*

Be it known that I, WILLIAM H. WALTON, of the city, county, and State of New York, have invented certain new and useful Improvements in Carding Machinery; and I do hereby declare and ascertain my said invention as follows, referring therein to the accompanying drawing, which is a vertical longitudinal section of one form of my machine.

My invention relates, first, to stripping the top-flats of a machine-card by certain automatic apparatus; and, secondly, to the employment of two or more "lickers-in," acting together as workers by being brought into contact with each other, for the purpose of working the fiber before it passes onto the main cylinder, and also to the employment of small workers therewith. These devices consist of top-flats suspended upon pivots placed at the center of their ends with toothed pinions upon them, by which they are raised from their position and turned over to be stripped, a rotating brush being employed to strip the flats or lags, which is in its turn stripped by a small cylinder-worker, which carries back the strippings to the upper licker-in, and there being two or more lickers-in working together they act as workers, as above stated, and return the strippings straightened to the main cylinder along with the fiber fed into the machine. This operation is continued until the whole of the available fiber is properly worked and fed through the machine, by which a saving of waste is effected and greater rapidity given to the operation of carding.

The following is a description of the machine: *a a'* are two rollers, from which the cotton is delivered to the machine. They are placed one directly above the other. From thence the cotton passes to and between two small rollers, *b b* or *b' b'*, when these are used. The cotton from the lower roller, *a*, passes on to the licker-in opposite to it. That from *a'* is delivered onto the licker-in above. This gives a double feed; but I sometimes omit one feed and simply feed onto the upper or lower licker-in. Of the series there are two lickers-in which work together to work and straighten the fiber. These are lettered *c c'*. They partially prepare the fiber for the main cylinder. From them the cotton passes onto two other lickers-in when a double series are used. These are in the drawing lettered *d d'*. There the fiber is again worked, and for further aiding this operation there are small workers *e e'* above. The course of revolution of these cylinders are all indicated by arrows, as shown in the drawing, and they are driven by gearing well known to machinists and carding-machine makers.

It is obvious that if but one set of lickers-in or workers are used, the feed from *a'* would be directly upon *d'*, and if more were used beyond *c c'* the feed would be onto the outer, upper, or lower licker-in or worker, if one feed were used.

The small cylinder *e'*, which works the cotton on the main cylinder *f*, is stripped by the licker-in *d'*, which latter returns it to the main cylinder after working it with the licker-in *d*, by which it is partially straightened and laid with the cotton direct from the feeding-roller. By this system of making the lickers-in workers by running two or more in contact with each other the material is more evenly presented to the main cylinder *f*. The cylinder *f* runs in contact with the lickers-in *d d'*, and from each receives the fibers for carding, by which a much greater rapidity of carding is effected without clogging.

Cylinder *f* passes round to the flats or top-workers *h* with the fibers received from the lickers-in, and thence to the doffer *i*, whence it passes out of the machine in the usual way.

Each of the top flats or workers *h* are clothed on both sides, and their ends rest on a ledge or screws on the permanent frame, outside of which there is an upward projection of the frame, having recesses in it that serve for guards for round journals X, which project from the ends of the top flats or workers *h*. At one end there is a pinion affixed to the stud of each worker or top flat *h*.

An arm, K, is centered on the journals of axis of the main cylinder *f*, on each side, which project upward above the top of the said cylinder *f*, and form bearings for a cylinder-brush, *l*, of small diameter, and a clothed cylinder or doffer, *m*, a little behind and above. When the arm K sweeps forward, the brush, which is in rapid revolution, driven by a band from the main cylinder-shaft, brushes over and cleans the sides of the flats or workers *h* that are uppermost, the brush being in turn cleaned by the revolving card-cylinder *m*, whence the fibers are conveyed to the cylinder *e'* and are reconveyed upon the cylinder *f* as the arms K move forward, as above stated. A projecting piece, K′, strikes the workers or flats and raises them from their bed, and the piece K′, on one side being cogged, takes into the pinions on their journals and causes each to make a semi-revolution, thus bringing the working-surface up to be cleaned, by the action of the brush *l*, which succeeds. The arms K have a segment-gear, *p*, affixed to them that gears into segment *q* on a revolving wheel, *r*, driven by gearing from the doffer *i*; or there are two of these wheels *r*, and they run in opposite directions, by which means the arms K vibrate first forward and then back. The gearing in the drawing is shown in blue ink.

I wish it to be distinctly understood that I do not claim two sets of feed rollers combined with a carding-machine, as they have before been used; nor do I claim two independent lickers-in, working onto the main cylinder, when they are not used as "workers together," as they are on machines previously devised; but

What I claim as my invention, and for which I desire to secure Letters Patent, is—

1. Suspending the top flats or workers upon pivots in the center of their ends, by which they can be raised out of the way of the adjoining flats and turned by a rack working into pinions, or the equivalent thereof, the whole being constructed and arranged substantially as herein described, for the purpose set forth.

2. Stripping the flats or workers by a rotating brush so arranged that a card may strip the brush and return the strippings to the main cylinder, substantially in the manner and for the purposes described.

3. The combination and employment of two or more lickers-in acting as lickers-in and "workers" by running in contact with each other, or their equivalent, for the purpose of working the fiber before it enters onto the main cylinder, in the manner specified and for the purposes set forth.

W. H. WALTON.

Witnesses:

H. S. SMITH,
J. L. EGBERT.